(12) United States Patent  
Deguchi (10) Patent No.: US 7,372,958 B2  
(45) Date of Patent: May 13, 2008

(54) PORTABLE COMMUNICATION APPARATUS

(75) Inventor: Manabu Deguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 504 days.

(21) Appl. No.: 09/965,889

(22) Filed: Oct. 1, 2001

(65) Prior Publication Data

US 2002/0009193 A1 Jan. 24, 2002

Related U.S. Application Data

(62) Division of application No. 09/192,303, filed on Nov. 17, 1998.

(30) Foreign Application Priority Data

Nov. 17, 1997 (JP) .................................. 9-332417

(51) Int. Cl.
*H04M 1/00* (2006.01)
(52) U.S. Cl. .......................... 379/433.06; 379/433.01; 379/433.04; 379/433.07
(58) Field of Classification Search ........... 379/433.06, 379/433.07, 368, 433.04; 455/566, 90.3, 455/575.1, 575.4
See application file for complete search history.

(56) References Cited

U.S. PATENT DOCUMENTS

| 4,611,102 | A | | 9/1986 | Ishida |
| 4,739,128 | A | | 4/1988 | Grisham |
| 5,231,386 | A | | 7/1993 | Brandenburg et al. |
| 5,235,568 | A | * | 8/1993 | Masaru .......................... 369/2 |
| 5,594,778 | A | | 1/1997 | Schaupp et al. |
| 5,901,222 | A | | 5/1999 | Macor |
| 5,987,336 | A | * | 11/1999 | Sudo et al. .................. 455/566 |
| 6,128,475 | A | * | 10/2000 | Wicks et al. ............. 455/575.4 |
| 6,128,480 | A | * | 10/2000 | Ohmori ....................... 455/400 |
| 6,480,725 | B2 | * | 11/2002 | Cassidy et al. ............. 455/558 |
| 6,519,480 | B1 | * | 2/2003 | Wicks et al. ................ 455/566 |

FOREIGN PATENT DOCUMENTS

| CN | 1123509 A | 5/1996 |
| EP | 0 602 840 A | 6/1994 |
| EP | 0 685 953 A | 12/1995 |
| JP | 4-29426 | 1/1992 |
| JP | 5-244241 | 9/1993 |
| JP | 6-90200 | 3/1994 |
| JP | 6-232992 | 8/1994 |
| JP | 6-338931 | 12/1994 |
| JP | 6-343094 | 12/1994 |
| JP | 8-79830 | 3/1996 |
| JP | 10-289045 A | 10/1998 |
| WO | WO 94/01958 A | 1/1994 |
| WO | WO 97/35413 A | 9/1997 |

* cited by examiner

*Primary Examiner*—Rasha S. Al-Aubaidi
(74) *Attorney, Agent, or Firm*—Sughrue Mion, PLLC (57) ABSTRACT

A portable communication apparatus includes arrow keys for moving a highlight bar to select one of a plurality of information items displayed on screen and an Enter key for executing a selected information item. The arrow keys and the Enter key are disposed close to each other within one area on the housing.

8 Claims, 8 Drawing Sheets

PORTABLE COMMUNICATION APPARATUS

This is a divisional of application Ser. No. 09/192,303 (Confirmation Number not yet assigned) filed Nov. 17, 1998, the disclosure of which is incorporated herein by reference.

BACKGROUND OF THE INVENTION

1. Field of the Invention

The present invention relates to a portable communication apparatus such as a portable telephone or the like, and relates, more particularly, to a portable communication apparatus having a function for displaying options to be selected on a display.

2. Description of Related Art

There have been proposed portable telephones having a selection means for selecting a desired one from various information items displayed on a display such as a liquid-crystal display or the like.

For example, a compact portable radio telephone apparatus disclosed in Japanese Patent Application Laid-open Publication No. 4-29426 is provided with a scroll key for scrolling information on screen and ENTER keys disposed at positions corresponding to displayed options, respectively. And a user can select a necessary option from the displayed options by depressing the corresponding ENTER key.

Further, a portable telephone disclosed in Japanese Patent Application Laid-open Publication No. 6-338931 is provided with a table in which dial numbers are registered and the user can select a registered dial number to display it on screen by depressing keys on a keypad that is changed into an abbreviated dialing mode. Thereafter, the user can make a call according to the selected dial number by depressing a calling key.

However, according to the above-described conventional telephone apparatuses, key operation is complex and a dialing procedure is cumbersome particularly in the case of dialing numbers used frequently. Thus, it has been necessary for the user to depress keys by moving fingers repeatedly. In the case of the above-described apparatus using the scroll key and ENTER keys to select a desired option, it is necessary to select it by moving a finger to the corresponding ENTER button each time the desired option is displayed by scrolling. The reason is that the ENTER buttons are disposed at preset positions under the display screen.

Further, according to the other method of selecting a registered number by changing the key operation into an abbreviated dialing mode, it is not only necessary to change the key operation into the abbreviated dialing mode but also to search for a desired telephone number through key operation in the abbreviated dialing mode. Further, a calling key operation is additionally required for dialing.

SUMMARY OF THE INVENTION

It is an object of the present invention to provide a portable communication apparatus that enables a user to select a desired one from information items displayed on a display by simplified key operation.

It is another object of the present invention to provide a portable communication apparatus that enables a user to easily select a desired dial number and to make a call in a simple manner.

According to an aspect of the present invention, a portable communication apparatus has a display and a keypad on a main side of a housing thereof, wherein the keypad includes a key section comprising at least one key which is used to select a desired information item from a plurality of information items displayed in the display and then to execute a selected information item. Since selection and execution of a desired information item can be performed by the key section only, the operability of selection and execution is improved.

According to another aspect of the invention, a portable communication apparatus has a display and a keypad on a main side of a housing thereof, the keypad comprising two key sections which are separately provided on the main side, wherein a predetermined one of the two key sections comprises a plurality of key contacts which are used to select a desired information item from a plurality of information items displayed in the display and then to execute a selected information item.

Since selection and execution of a desired information item can be performed by the predetermined key section only, the operability of selection and execution is improved. Further, since the predetermined key section is disposed with a space from the other key section, the keypad operability is further improved.

Further, according to still another aspect of the invention, a portable communication apparatus has a display and a keypad on a main side of a housing thereof, the keypad comprising a first key section and a second key section which are separately provided on the main side, wherein the first key section comprises a plurality of key contacts which are used to select a desired information item from a plurality of information items displayed in the display and then to execute a selected information item; and the second key section comprises a ten-key pad. The portable communication apparatus further comprises a memory for storing a plurality of names and destination addresses corresponding to the names and a controller for selecting a desired name and a destination address corresponding to the desired name and executing a calling operation according to the destination address of the desired name according to a series of operations of the first key section.

Since selection and execution of a calling operation according to the desired destination address are performed in the first key section within the keypad, the calling operation is facilitated.

DETAILED DESCRIPTION OF THE PREFERRED EMBODIMENTS

Figure 1:
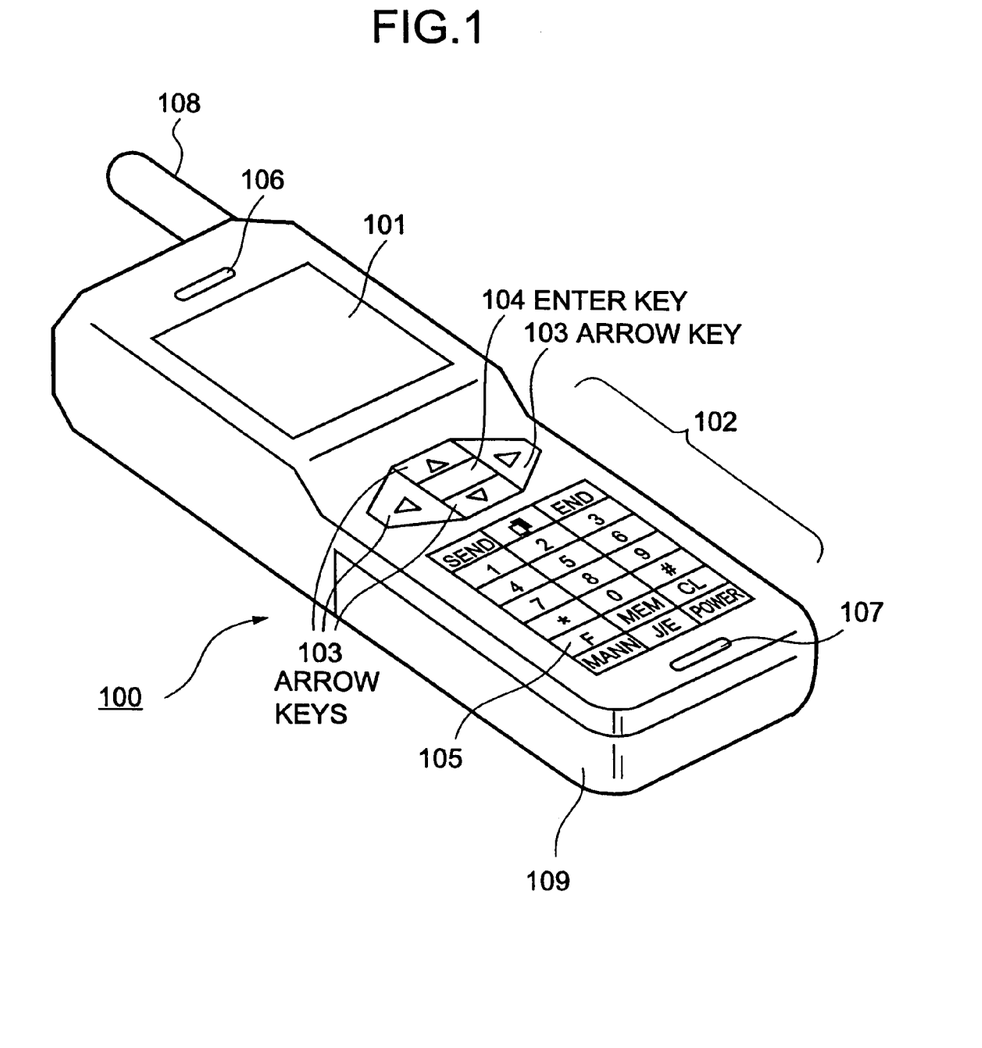
FIG. 1 is a perspective view for showing an appearance of a portable telephone as a first embodiment of a portable communication apparatus according to the present invention.

Referring to FIG. 1, a main body 100 of the portable telephone is provided with a display 101 such as a liquid crystal display (LCD) and a keypad 102 having a layout of various keys. The display 101 and the keypad 102 are provided in a main surface of a housing of the main body 100.

The keypad 102 is comprised of a first part and a second part. The first part consists of arrow keys 103 and an Enter key 104 and a second part consists of a menu key 105 and other keys including a ten-key pad. A speaker 106 is disposed as a telephone receiver at an upper portion of the main body 100 and a microphone 107 is disposed as a telephone transmitter at a lower portion of the main body 100. Further, an antenna 108 is provided on the upper surface of the main body 100 and a battery pack 109 is detachably provided on the rear surface of the main body 100.

In the first part of the keypad 102, four arrow keys 103 corresponding to up, down, left and right directions are disposed to surround the Enter key 104. In the main body 100, a center key contact corresponding to the Enter key 104 and four key contacts corresponding to the four arrow keys 103 are provided with the center key contact surrounded by the four key contacts. By selectively depressing the arrow keys 103, a highlight bar displayed in the display 101 can be moved horizontally and vertically on the screen, that is, in up, down, left and right directions, as described later. An information item positioned by the highlight bar is selected and executed by pressing the Enter key 104. For example, a calling is made or a menu item is carried out. The Enter key 104 can also function as a normal calling key.

A user moves the highlight bar to a desired information item displayed on the display 101 by selectively operating the up, down, left and right arrow keys 103, with a thumb, for example. When the Enter key 104 at the center is depressed with the same thumb immediately after the highlight bar has reached the desired information item, an operation corresponding to the desired information item can be executed. In other words, it is possible to carry out the necessary operation by just placing the finger at the first part of the keypad 102 without moving the finger to a long distance.

Although the four arrow keys 103 are used to move the highlight bar on the display 101 in the four directions of up, down, left and right directions in this case, it is also possible to provide only two arrow keys to move the highlight bar in only two directions of left and right or up and down directions. The number of the arrow keys 103 can be determined according to the volume of information that can be displayed in the display 101 of the telephone. For example, if the display 101 can display only about one to three names of destinations in a telephone directory function, only two arrow keys 103 are sufficient to search for a desired telephone number in two directions.

Further, according to the present embodiment, a spacing between the first part and the second part of the keypad 102 causes movement and enter operations by the arrow keys 103 and Enter key 104 of the first part to be made easier. It is also possible to form the first part and the second part within one area of the keypad 102 so long as the easiness of operation is not lost. It is needless to mention that even in this case the arrow keys 103 and the Enter key 104 are disposed close to each other as the first part.

Figure 2:
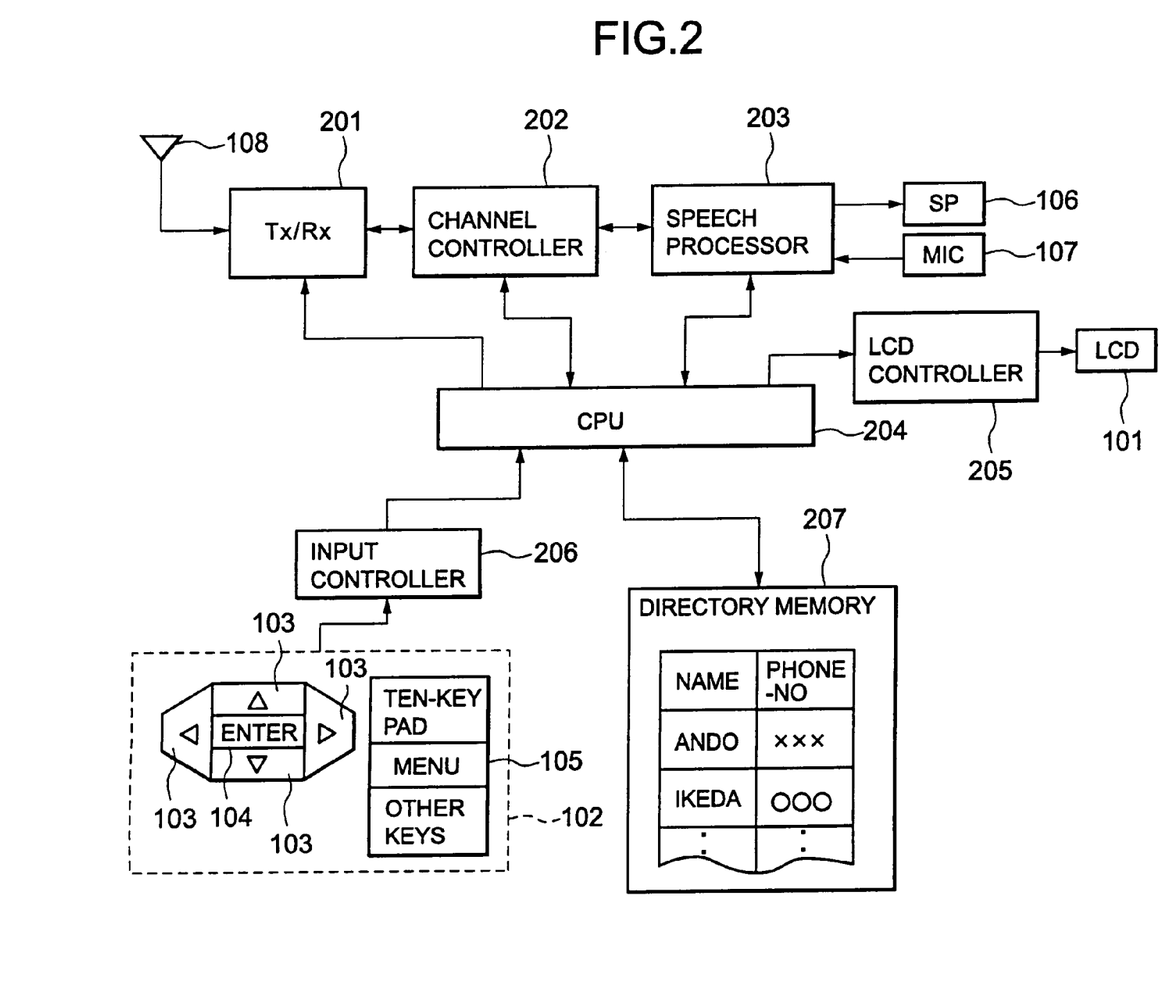
FIG. 2 is a schematic block diagram for showing an internal circuit structure of the present embodiment.

Referring to FIG. 2, inside the main body 100 of the portable telephone, there are built a transceiver 201, a channel controller 202, a speech processor 203 and a microprocessor (CPU) 204 which provide a radio telephone function. The antenna 108 is connected to the transceiver 201, and the microphone 107 and the speaker 106 as a telephone transmitter and a telephone receiver respectively are connected to the speech processor 203. The LCD display 101 is connected to an LCD controller 205 which is controlled by the microprocessor 204, and various kinds of key operation signals of the keypad 102 are input to the microprocessor 204 through an input controller 206. In the present embodiment, there is provided a directory memory 207 storing registered names and telephone numbers of persons to communicate with, and these names and telephone numbers are read and written under the control of the microprocessor 204. The operation of the present embodiment will be explained in detail with reference to examples shown in FIGS. 3 to 6.

Referring to FIG. 3 and FIGS. 4A-4E, it is assumed that the Enter key 104 also has a function of a normal calling function, that is, registered names or a set of registered names and telephone numbers are displayed on the display 101 by operating the Enter key 104.

Figure 3:
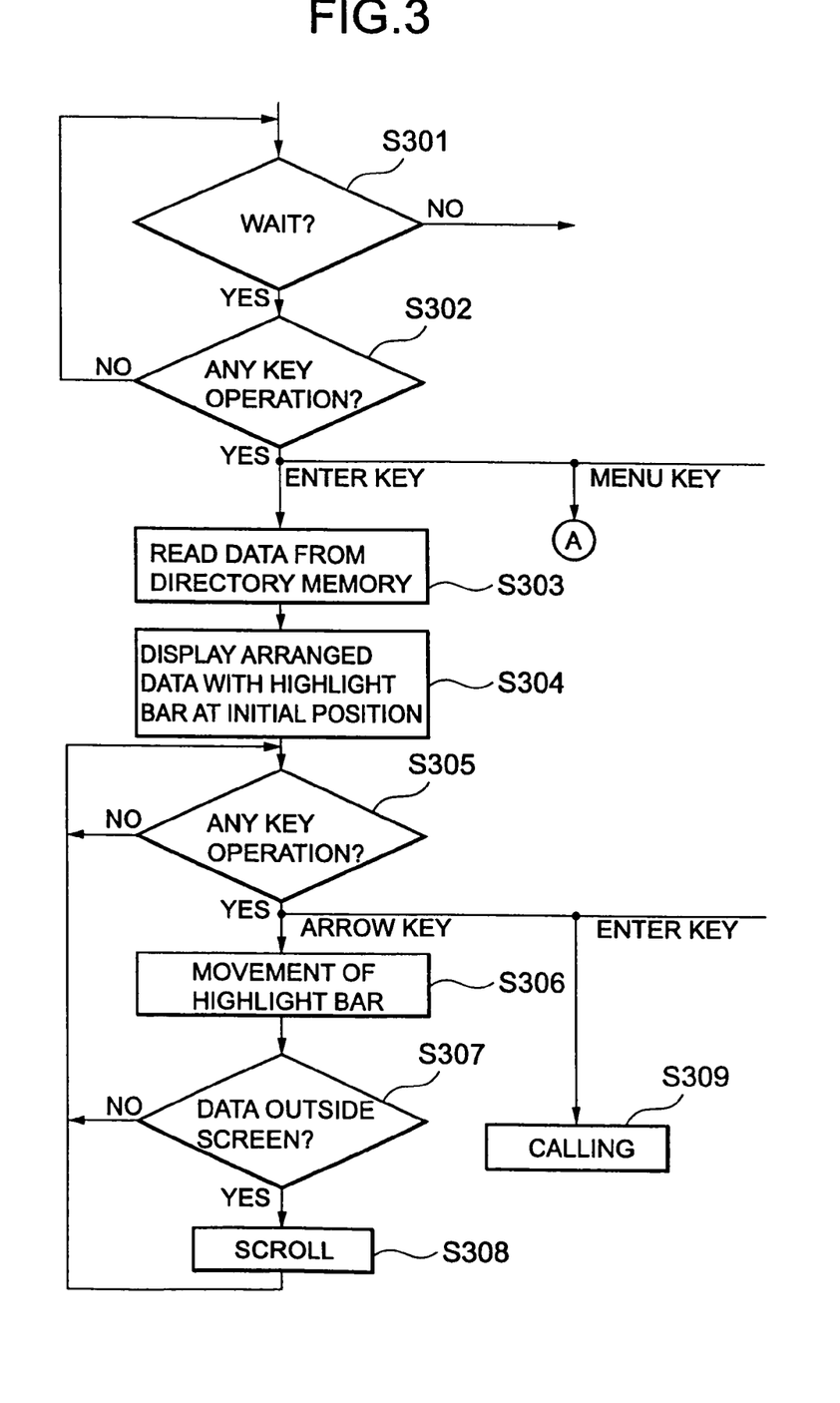
FIG. 3 is a flowchart for showing one example of a calling operation in the present embodiment.
Figure 4A:
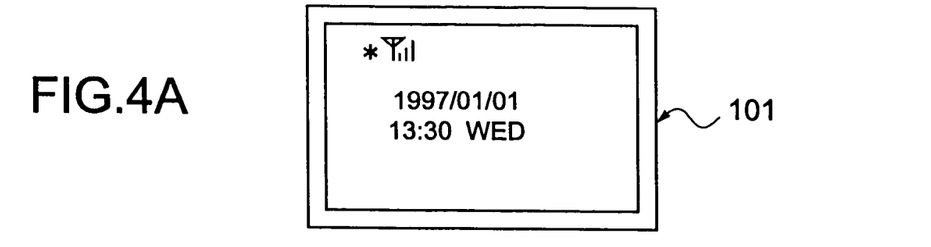
FIGS. 4A-4E are views for showing examples of display corresponding to the calling operation as shown in FIG. 3.

At first, when the microprocessor 204 is in a waiting status (YES at step S301) and also when a key operation is not carried out (NO at step S302), date and time information as shown in FIG. 4A is being displayed in the display 101.

When the Enter key 104 is depressed in this waiting status (YES at step S302), the microprocessor 204 reads out data from the directory memory 207 (step S303) and displays a plurality of names arranged in an alphabetical order, with the highlight bar at an initial position, in the display 101 (step S304).

Figure 4B:
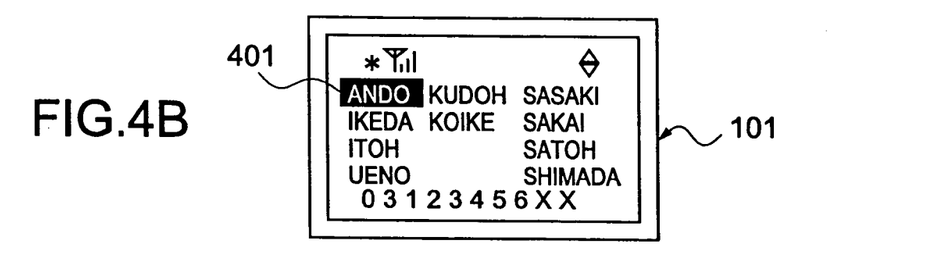

For example, names starting from 'A' (Japanese alphabet) are displayed in the left column of the display 101: Ando, Ikeda, Itoh, Ueno, Okada, and so on. Names starting from 'Ka' (Japanese alphabet) are displayed in the middle column: Kudoh and Koike. Names starting from 'Sa' (Japanese alphabet) are displayed in the right column: Sasaki, Sakai, Satoh, Shimada and so on, as shown in FIG. 4B.

In English, similarly, names may be displayed in the display 101 with starting from letter A on the left column, names starting from letter B in the middle column and names starting from letter C in the right column.

A highlight bar 401 inversely displays the highlighted name, with a left column top name initially highlighted, and a telephone number corresponding to the highlighted name is displayed always at the bottom row on screen.

Figure 4C:
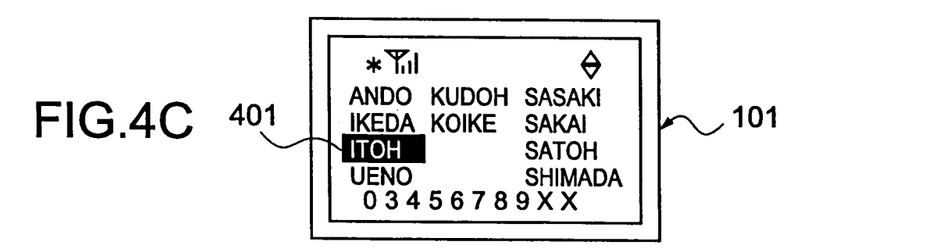

Then, when one of the arrow keys 103 is depressed (YES at step S305), the highlight bar 401 moves in a direction of the depressed arrow key 103 (step S306). For example, when the arrow key 103 indicating the down direction is depressed two times, the highlight bar 401 moves to "Itoh" two rows below "Ando" and a telephone number of "Itoh" is displayed at the bottom row as shown in FIG. 4C.

In the case of English names arranged in alphabetical order on screen, for example, Anderson, Ando, Annice, and Arward, "Anderson" is initially highlighted. And when the arrow key 103 indicating the down direction is depressed two times, the highlight bar 401 moves to "Annice" two rows below "Anderson" and a telephone number of "Annice" is displayed at the bottom row on screen.

When the highlight bar 401 moves in up, down, left and right directions within the current display area of the display 101 (NO at step S307), only the highlight bar 401 moves according to operations of the arrow keys 103 (steps S305 to S307).

Figure 4D:
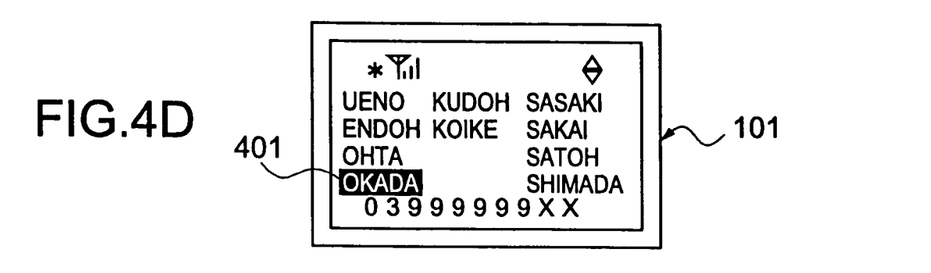

When the highlight bar 401 moves to the outside of the current display area of the display 101 (YES at step S307), the microprocessor 204 scrolls the display screen of the display 101 so as to display hidden data by the arrow keys 103 (step S308). In this way, the highlight bar moves to the name which is at a location determined by direction and number of depressing of the arrow key 103. For example, when the arrow key 103 of the down direction is depressed by further four times, the display data in the column of names starting from Japanese alphabet 'A' is scrolled down to move the highlight bar 401 from the position of "Itoh" to "Okada", a fourth name below "Itoh", as shown in FIG. 4D. In this embodiment, only the display data of the column in which the highlight bar 401 is located is scrolled, allowing easy operation in case of searching other columns.

Figure 4E:
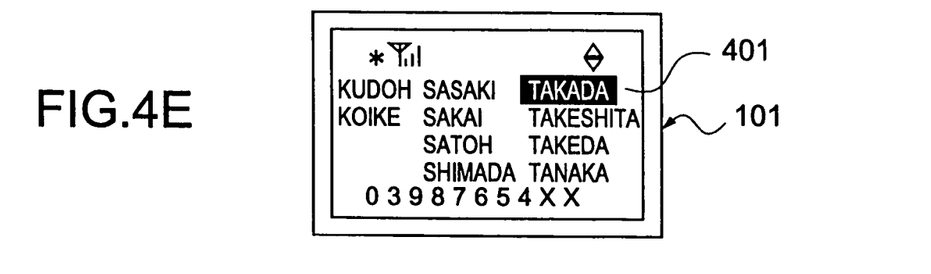

On the other hand, when the arrow key 103 of the right direction is depressed three times in the state that the highlight bar 401 is at the initial position, the display data is scrolled in the right direction at the third time of depressing the arrow key, and the highlight bar 401 moves from "Ando" to "Takada", a third name to the right, as shown in FIG. 4E.

After moving the highlight bar 401 to a name to whom a user intends to make a call by operating the arrow keys 103, the user depresses the Enter key 104 surrounded by the arrow keys 103 (YES at step S305). Then, the microprocessor 204 starts a calling operation by using a telephone number corresponding to the selected name (step S309).

Figure 5:
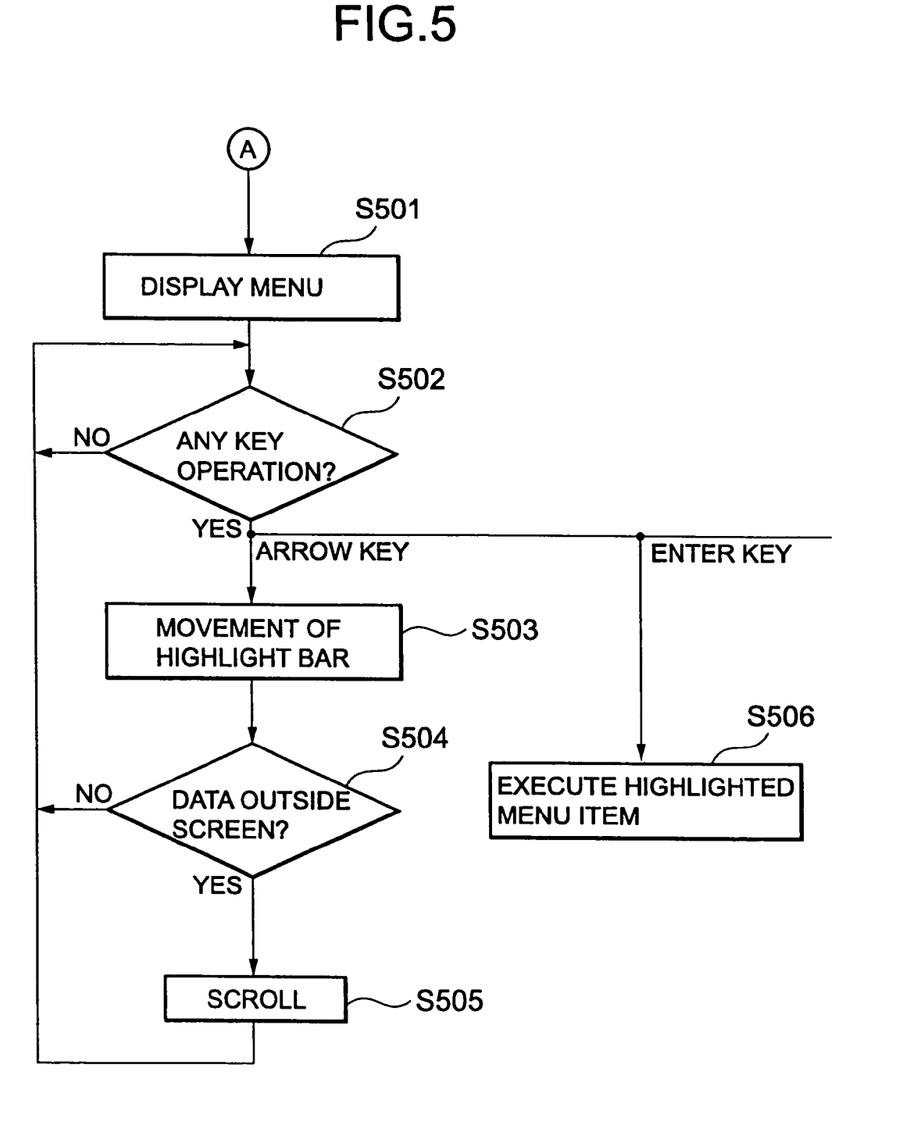
FIG. 5 is a flowchart for showing one example of a menu display operation in the present embodiment.
Figure 6A:
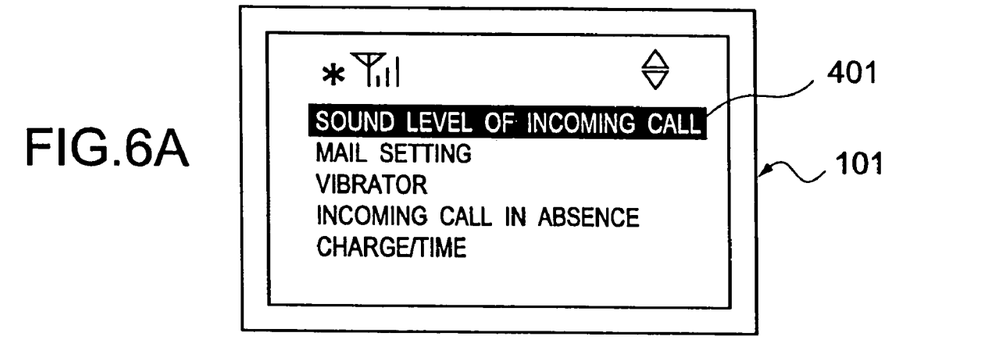
FIGS. 6A-6B are views for showing examples of display corresponding to the menu display operation.
Figure 6B:
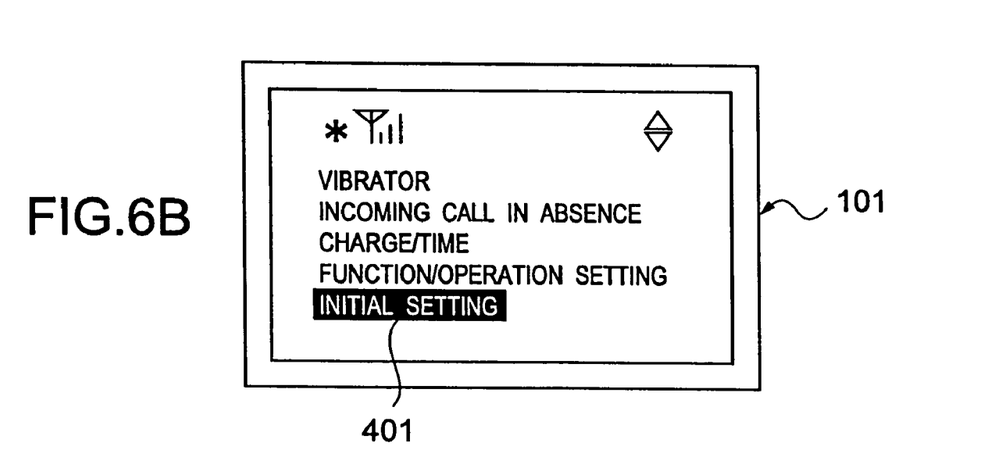

Referring to FIG. 5 and FIGS. 6A-6B, when the menu key 105 is depressed in a waiting status (step S302 in FIG. 3), the microprocessor 204 makes a predetermined list of functions displayed in the display 101 (step S501). For example, as shown in FIG. 6A, functions such as "Sound level of incoming call", "Mail setting", etc. are displayed, with the highlight bar 401 at the top initial position.

When any one of the arrow keys 103 is depressed (YES at step S502), the highlight bar 401 moves in the direction of the depressed arrow key 103 (step S503). For example, when the arrow key 103 of the down direction is depressed two times, the highlight bar 401 moves to "Vibrator", two names below "Sound level of incoming call". When the highlight bar 401 moves within the current display area of the display 101 (NO at step S504), only the highlight bar 401 moves according to the depressing of the arrow keys 103 (steps S502 to S504).

When the highlight bar 401 moves to the outside of the current display area of the display 101 (YES at step S504), the microprocessor 204 scrolls the display screen of the display 101 so as to display hidden function items by the arrow keys 103 (step S505). In this way, the highlight bar moves to the function item which is at a location determined by direction and number of depressing of the arrow key 103. For example, when the arrow key 103 of the down direction is depressed by six times, the displayed items are scrolled and the highlight bar 401 moves from "Sound level of incoming call" to "Initial setting", a sixth name below, as shown in FIG. 6B.

After moving the highlight bar 401 to a desired function item by operating the arrow keys 103, a user depresses the Enter key 104 surrounded by the arrow keys 103(YES at step S502). Then, the microprocessor 204 executes the selected function (step S506).

Figure 7:
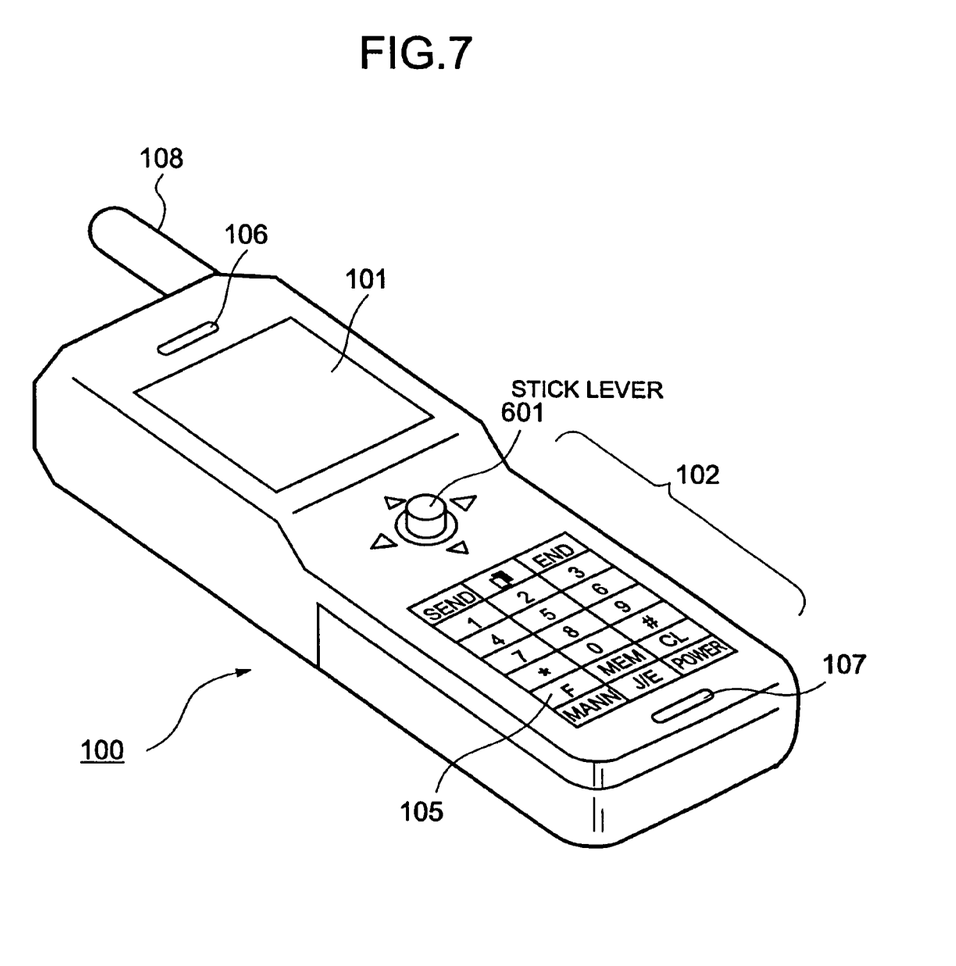
FIG. 7 is a perspective view for showing an appearance of a portable telephone as a second embodiment of a portable communication apparatus according to the present invention.

Referring to FIG. 7, there is shown a second embodiment of the present invention. In the present embodiment, a keypad 102 also has a first part and a second part. However, the structure of the first part is different from that of the first embodiment with all the other structural elements being the same as those of the first embodiment and thus their detailed explanation will be omitted with denoted by the same reference numerals.

In the first part of the keypad 102, a stick lever 601 is provided instead of the arrow keys 103. The stick lever 601 is a switch having contacts in four directions of up, down, left and right directions as described in detail later. By inclining the stick lever 601 to a desired direction, the highlight bar 401 can be moved on the display screen in the manner as described above. Further, if the stick lever 601 is structured as a push-button surrounded by the four-direction contact switch, a depression of the stick lever 601 can have the same function as the depression of the Enter key 104 for executing a selected name, with improved operation of the keypad.

The shape of the stick lever 601 may be determined by considering easy of use. If the stick lever 601 is button-shaped as shown in FIG. 7, a user can perform the selection and entering operation by just placing a thumb, for example, on the upper surface of the stick lever 601. The stick lever 601 is inclined to a desired direction to move the highlight bar 401, and, when reaching a desired name of a person to communicate with or a desired menu item, the stick lever 601 is depressed with the thumb to execute the desired operation.

Figure 8A:
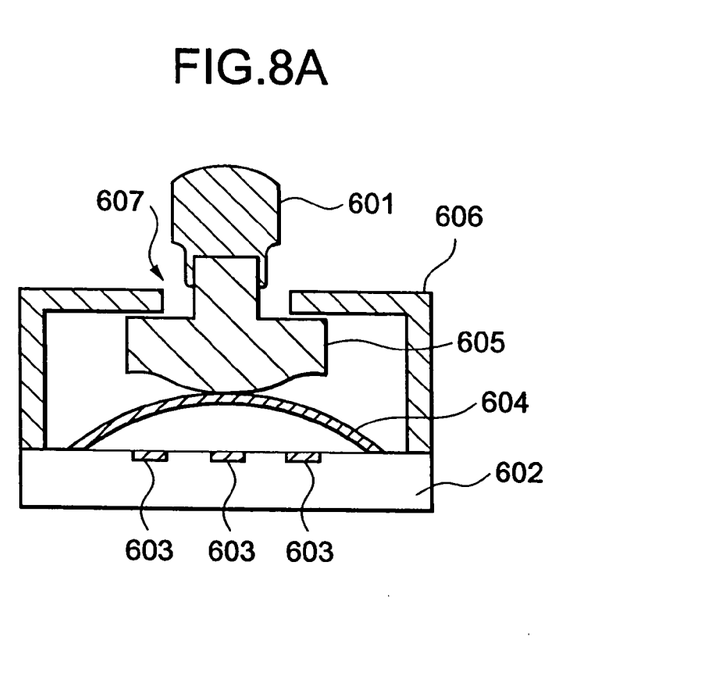
FIG. 8A is a cross-sectional view showing the inner structure of a lever switch used in the second embodiment as shown in FIG. 7.

Referring to FIG. 8A, a substrate 602 has a plurality of contacts 603 formed thereon and covered with a metal dome 604. None of the contacts 603 normally makes contact with the metal dome 604. An actuator 605 is placed on the top of the metal dome 604 within a housing 606 and is coupled with the stick lever 601 through an opening 607 formed in the top of the housing 606.

Figure 8B:
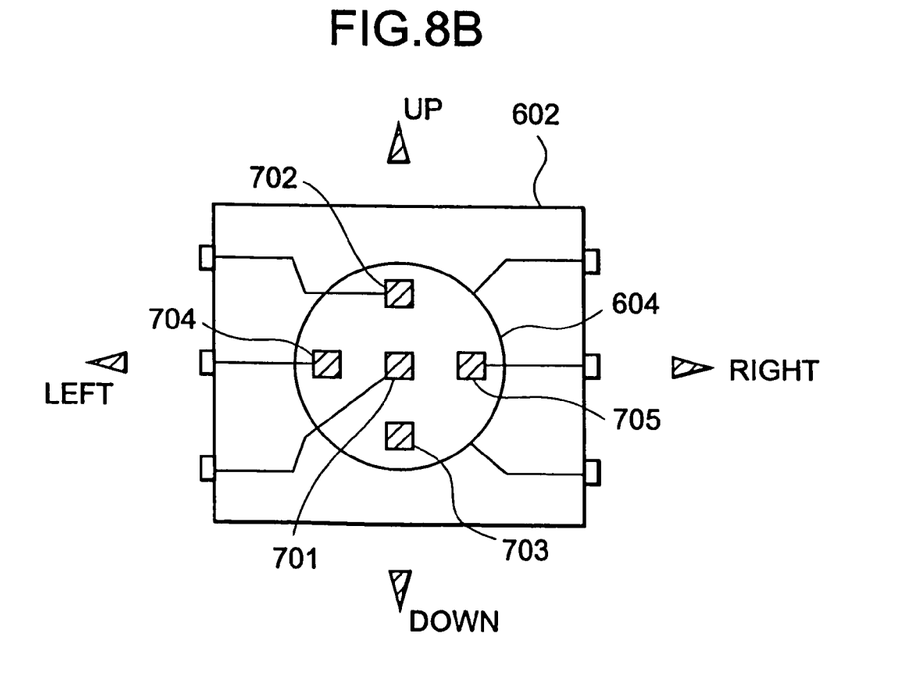
FIG. 8B is a plan view showing an arrangement of switch contacts in the lever switch as shown in FIG. 8A.

As shown in FIG. 8B, five contacts 701-705 are arranged on the substrate 602. The center contact 701 is surrounded by other contacts 702-705,which are spaced uniformly. In this case, the respective contacts 702, 703, 704 and 705 correspond to up, down, left and right directions. The center contact 701 is provided for Enter operation.

When the stick lever 601 is inclined in the up direction, the corresponding edge of the actuator 605 presses down the metal dome 604 to put the metal dome 604 into contact with only the contact 702. This causes the highlight bar 401 to move in the up direction. It is the same with other contacts 703-705. When reaching a desired name of a person to communicate with or a desired menu item, the stick lever 601 is depressed with the thumb. This causes the metal dome 604 to be pressed down at the center thereof to put it into contact with the center contact 701 and thereby the desired operation is executed.

In this manner, it is possible to achieve equivalent functions of the arrow keys 103 and the Enter key 104 with only one stick lever 601. Therefore, such a control switch like a joystick contributes to improved operability and reduced size of the telephone.

As described above, according to the present invention, since the arrow keys and the Enter key are disposed close to each other almost in one integration, it becomes possible to select and input necessary display information with minimum move of a finger. Therefore, selection of a desired one from a plurality of display information items can be facilitated extremely without involving a trouble of finding keys. Similarly, selection of a desired one from various displayed functions can be facilitated. The information entering is performed with a mere depressing of the Enter key disposed closely. Thus, according to the present invention, it becomes possible to improve substantially the operability of a portable communication apparatus.

Furthermore, according to the present invention, since it is also possible to achieve equivalent functions of the arrow keys and the Enter key with only one stick lever, the stick lever can contribute to further improve the operability and reduce the size of a portable communication apparatus.

What is claimed is:

1. A portable communication apparatus having a display section and a key operation section, the key operation section comprising:
   a first key section including a selection key pad which is used to select a desired information item, and an execution key used to execute the desired information item selected by the selection key pad, wherein the execution key has a calling function; and
   a second key section including a ten key pad, wherein the first key section and the second key section are provided close to each other and are disposed immediately below the display section,
   wherein the display section displays a plurality of information items in a plurality of rows and columns that may be selected as a first information item,
   wherein one of the information items is initially selected as the first information item,
   wherein the selection key pad comprises a first key, a second key, a third key and a fourth key,
   wherein pressing the first key selects a second information item displayed in a row immediately preceding the row of the first information item as the first information item;
   wherein pressing the second key selects a third information item displayed in a column immediately following the column of the first information item as the first information item;
   wherein pressing the third key selects a fourth information item displayed in a row immediately following the row of the first information item as the first information item; and
   wherein pressing the fourth key selects a fifth information item displayed in a column immediately preceding the column of the first information item as the first information item.

2. The portable communication apparatus according to claim 1, wherein
   the execution key comprises an enter key disposed at a position sandwiched by the first key, second key, third key, and fourth key, for executing the selected information item.

3. The portable communication apparatus according to claim 2, wherein the first key section comprising the movement operation keys and the enter key is disposed with a space from the second key section.

4. The portable communication apparatus according to claim 1, wherein
   the selection key pad comprises a plurality of switch contacts each corresponding to respective different directions to select a desired information item; and
   the execution key comprises a depression switch contact sandwiched between the plurality of switch contacts.

5. The portable communication apparatus according to claim 1, wherein the first key section and the second key section are provided in one housing.

6. The portable communication apparatus according to claim 1, wherein the display section and the key operation section are disposed on one side of a housing of the portable communication apparatus.

7. A portable communication apparatus having a display section and a key operation section, the key operation section comprising:
   a first key section including a selection key pad which is used to select a desired information item, and an execution key used to execute the desired information item selected by the selection key pad, wherein the execution key has a calling function; and
   a second key section including a ten key pad, wherein the first key section and the second key section are provided close to each other and are disposed immediately below the display section,
   wherein the display section displays a plurality of information items in a plurality of rows and columns that may be selected as a first information item,
   wherein one of the information items is initially selected as the first information item,
   wherein the selection key pad comprises a first key, a second key, a third key and a fourth key,
   wherein pressing the first key selects a second information item displayed in a row immediately preceding the row of the first information item as the first information item;
   wherein pressing the second key selects a third information item displayed in a column immediately following the column of the first information item as the first information item;
   wherein pressing the third key selects a fourth information item displayed in a row immediately following the row of the first information item as the first information item;
   wherein pressing the fourth key selects a fifth information item displayed in a column immediately preceding the column of the first information item as the first information item; and
   wherein:
      if the first key is pressed and the row immediately preceding the row of the first information item does not exist, selecting a second information item displayed in a row furthest from and following the row of the first information item as the first information item;
      if the second key is pressed and the column immediately following the column of the first information item does not exist, selecting a third information item displayed in a column furthest from and preceding the column of the first information item as the first information item;
      if the third key is pressed and the row immediately following the row of the first information item does not exist, selecting a fourth information item displayed in a row furthest from and preceding the row of the first information item as the first information item; and
      if the fourth key is pressed and the column immediately preceding the column of the first information item does not exist, selecting a fifth information item displayed in a column furthest from and following the column of the first information item as the first information item.

8. A portable communication apparatus having a display and a keypad on a main side of a housing thereof, the keypad comprising first and second key sections, which are separately provided on the main side, and a controller,
   wherein the first key section comprises a plurality of key contacts, which are used to select a desired information item from a plurality of information items displayed in a plurality of rows and columns on the display and then to execute a selected information item, wherein the key contacts are a plurality of movement operation key contacts and an execution key contact surrounded by the movement operation key contacts, and the second key section includes a ten-key pad, wherein the first key section comprises:

a first key, a second key, a third key and a fourth key which are separately provided each corresponding to the movement operation key contacts, for instructing a search direction to select the desired information item from the information items displayed in the display;

an execution key corresponding to the execution key contact for executing the selected information item, a menu key included in the second key section; wherein a calling function is assigned to the execution key by which a calling operation is executed according to a destination address selected by operating the first key section, wherein a controller is adapted to determine in a waiting state, which one of the execution key and the menu key is operated, when it is determined that the menu key has been operated, the execution key is assigned to a function for selecting a highlighted menu item, which is executed by the controller, wherein it is determined that the execution key has been operated, the controller is adapted to read by names from a memory to display the names on the display, and wherein depressing of the execution key a call is made at a targeted telephone number.

* * * * *